No. 758,985. PATENTED MAY 3, 1904.
W. LIEBL.
HOSE COUPLING.
APPLICATION FILED FEB. 5, 1904.
NO MODEL.
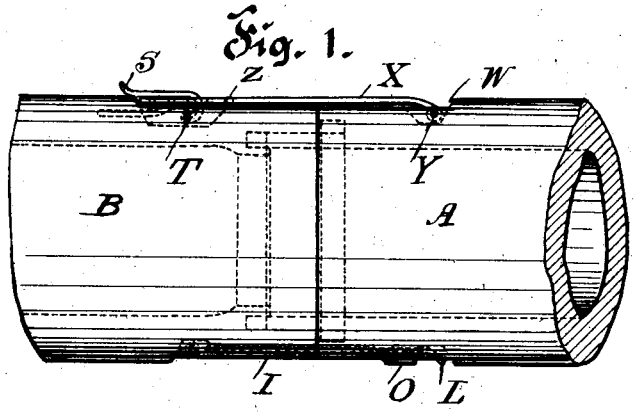
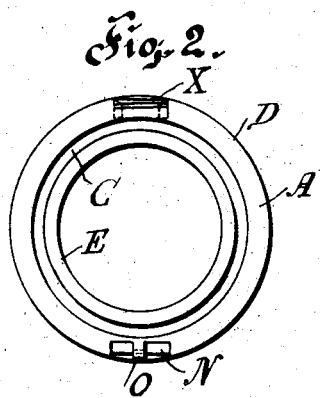
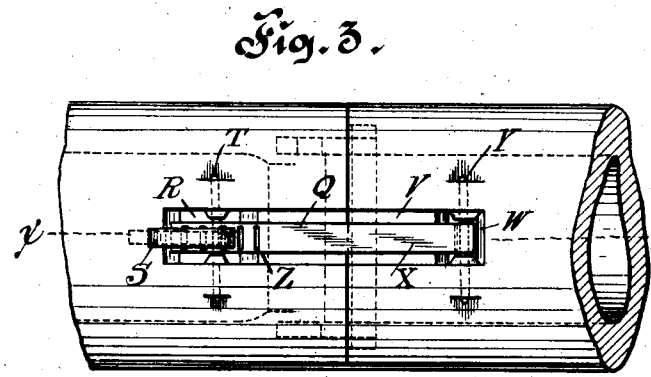
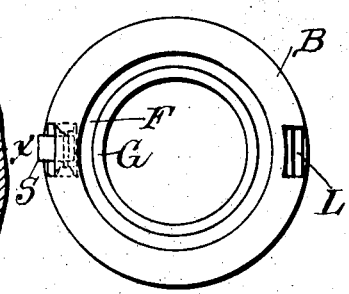
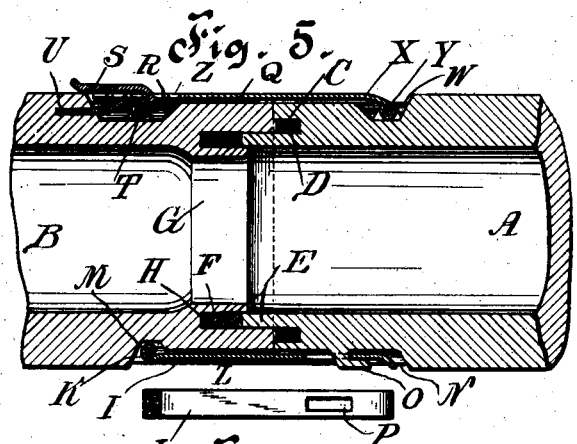
Witnesses:
Inventor
W. Liebl
By
Attorneys No. 758,985. Patented May 3, 1904.

UNITED STATES PATENT OFFICE.

WENZL LIEBL, OF PITTSBURG, PENNSYLVANIA.

HOSE-COUPLING.

SPECIFICATION forming part of Letters Patent No. 758,985, dated May 3, 1904.

Application filed February 5, 1904. Serial No. 192,214. (No model.)

*To all whom it may concern:*

Be it known that I, WENZL LIEBL, a citizen of the United States of America, residing at Pittsburg, in the county of Allegheny and State of Pennsylvania, have invented new and useful Improvements in Hose-Couplings, of which the following is a specification, reference being had therein to the accompanying drawings.

This invention has relation to hose-couplings, and has for its object the provision of novel means for securing a water-tight or steam-tight joint at the abutting ends of two members of a coupling, and has for its further object the provision of novel means for rapidly and effectively locking together and holding in locked position the adjacent members of a hose-coupling and for speedily and easily unlocking and detaching the same when it is desired to separate the adjacent members.

My invention consists in the novel configuration and construction of parts of the abutting ends of a coupling, and it further consists in the novel construction, combination, and arrangement of parts which constitute the devices for attaching together and locking in position the adjacent members of the coupling, which will be hereinafter fully described and claimed.

Referring to the accompanying drawings, Figure 1 is a side elevation of the adjacent interlocking ends of two members of a hose-coupling with my improvements applied thereto. Fig. 2 is an end view of one of the members. Fig. 3 is a top view of the two members shown in Fig. 1. Fig. 4 is an end view of another of the members. Fig. 5 is a vertical longitudinal sectional view on the line *x x* of Fig. 3. Fig. 6 is a detail view of part of the locking mechanism.

In the drawings corresponding letters of reference are used to indicate like parts in the several figures, and A designates the male member, and B the female member, of a coupling. The member A is formed with an annular groove C, in which is located an annular washer D, of elastic material, and within the groove C a projecting neck E is formed that enters the end of the member B and projects a short distance into an annular groove F, formed exteriorly of the annular shoulder G, formed in said member B, the groove F having an annular washer H, of flexible material, against which a collar E of the member A abuts, the said collar entering the groove F a short distance, as shown in Fig. 5. The collar E of member A projects into that part of the member B which projects beyond shoulder G, and by means of the construction and arrangement of parts above described a very tight joint is secured, which, as described, is furnished with two independent packings—that is, the washers D and H.

Upon one side of the coupling member B a groove I is formed, which terminates in a socket K, and in the socket K a link L is pivotally secured by a lateral pin M. The member A is formed with a groove N, corresponding in depth to the groove I and in alinement therewith, and in said groove N is located a hook O, with which the link L engages, the said link being formed with a slot P for the reception of said hook. Upon the side of the coupling member B opposite the groove I a similar groove Q is formed, which communicates with a socket R, and in said socket a curved latch S is pivoted on a transversely-arranged pin T. A spring U is socketed in the body of the member B at the rear end of the recess R and bears upon the curved inner end of the latch S just above the pivot T, the spring serving to maintain the latch in the position shown in the drawings. The member A is formed with a slot V, corresponding to the slot Q and in alinement therewith and terminating at its end in a recess W. In said recess W a tongue X is pivotally secured by means of a transverse pin Y, and the said tongue is formed with transverse slots Z, through which the latch S passes, the latter when in its locking position lying down upon the top of the tongue X, as shown in Figs. 1 and 5.

The coupling members are shown in locked engagement in the drawings, and in this position the link L, the tongue X, and the latch S all lie substantially within the circumference of the coupling members, so that the coupling is practically free from any projecting parts, and hence it may be dragged over the ground or other obstructions without danger of breaking or injuring any of the parts which secure the coupling members together. To detach the members one from the other, the latch S is lifted, swinging around on its pivotal point until it is in the vertical position, when the tongue Q is in turn lifted and disengaged from the latch, whereupon the coupling members may be opened, turning on the opposite edge as on a hinge, and then the link L is disengaged from the hook O and the members are free to be drawn apart.

The device herein described, it is to be understood, can be utilized as a hose-coupling proper, in which event the flexible hose-sections are connected to the members A and B in the usual or any suitable manner, or the device can be utilized as a pipe-coupling for pipes of any character.

Having fully described my invention, what I claim as new, and desire to secure by Letters Patent, is—

In a hose-coupling, the combination with a male member having a longitudinally-disposed slot and a hook therein, a longitudinally-disposed slot with a recess in its end and a slotted tongue pivoted in said recess, of a female member having two longitudinally-disposed slots adapted to aline with the slots of the adjacent male member, each of said slots having a recess at its end, a slotted link pivoted in one recess, a curved latch pivoted in the other recess of the female member, and a spring socketed in the member adjacent to said latch and bearing upon the same above its pivotal point, substantially as described.

In testimony whereof I affix my signature in the presence of two witnesses.

WENZL LIEBL.

Witnesses:
H. C. EVERT,
E. E. POTTER.